US011245994B2

(12) United States Patent
Ruaro et al.

(10) Patent No.: US 11,245,994 B2
(45) Date of Patent: *Feb. 8, 2022

(54) HEARING DEVICE WITH AN ANTENNA

(71) Applicant: GN HEARING A/S, Ballerup (DK)

(72) Inventors: Andrea Ruaro, Ballerup (DK); Sinasi Özden, Ballerup (DK)

(73) Assignee: GN HEARING A/S, Ballerup (DK)

( * ) Notice: Subject to any disclaimer, the term of this patent is extended or adjusted under 35 U.S.C. 154(b) by 36 days.

This patent is subject to a terminal disclaimer.

(21) Appl. No.: 16/683,210

(22) Filed: Nov. 13, 2019

(65) Prior Publication Data

US 2020/0178008 A1   Jun. 4, 2020

(30) Foreign Application Priority Data

Nov. 30, 2018   (EP) .................................. 18209631

(51) Int. Cl.
*H04R 25/00* (2006.01)
*G08C 17/04* (2006.01)
*H04B 5/00* (2006.01)

(52) U.S. Cl.
CPC ........... *H04R 25/554* (2013.01); *G08C 17/04* (2013.01); *H04B 5/0081* (2013.01)

(58) Field of Classification Search
CPC .... G08C 17/04; H04B 5/0081; H04R 25/554; H04R 2225/31; H04R 2225/49; H04R 2225/51; H04R 2225/57; H04R 25/552
USPC ......................................................... 381/315
See application file for complete search history.

(56) References Cited

U.S. PATENT DOCUMENTS

2020/0178006 A1* 6/2020 Ozden .................... H01Q 1/273
2020/0178007 A1* 6/2020 Ruaro ................... H04R 25/554

FOREIGN PATENT DOCUMENTS

| DE | 102017209813 B3 | 9/2018 |
| EP | 1389035 A2 | 2/2004 |
| EP | 1389035 A3 | 2/2008 |
| EP | 1962557 A2 | 8/2008 |
| EP | 1962557 A3 | 6/2010 |
| EP | 3209032 | 8/2017 |
| WO | WO 2010034353 A1 | 4/2010 |
| WO | WO 2016207215 A1 | 12/2016 |
| WO | WO 2017153274 A1 | 9/2017 |

OTHER PUBLICATIONS

Extended European Search Report dated May 28, 2019 for corresponding European Application No. 18209631.3.
Foreign OA for EP Patent Appln. No. 18209631.3 dated May 27, 2021.

\* cited by examiner

*Primary Examiner* — Phylesha Dabney
(74) *Attorney, Agent, or Firm* — Vista IP Law Group, LLP

(57) ABSTRACT

A hearing device includes: a carrier board; a multi-chip assembly including a magnetic induction control chip and a signal processor; a magnetic induction coil at the carrier board; a hearing device housing having a first end and a second end, the second end being opposite from the first end; and a battery, wherein the battery is provided closer to the second end of the hearing device housing than to the first end of the hearing device housing; wherein the multi-chip assembly and the magnetic induction coil are accommodated in the hearing device housing, and are between the battery and the first end of the hearing device housing.

21 Claims, 7 Drawing Sheets

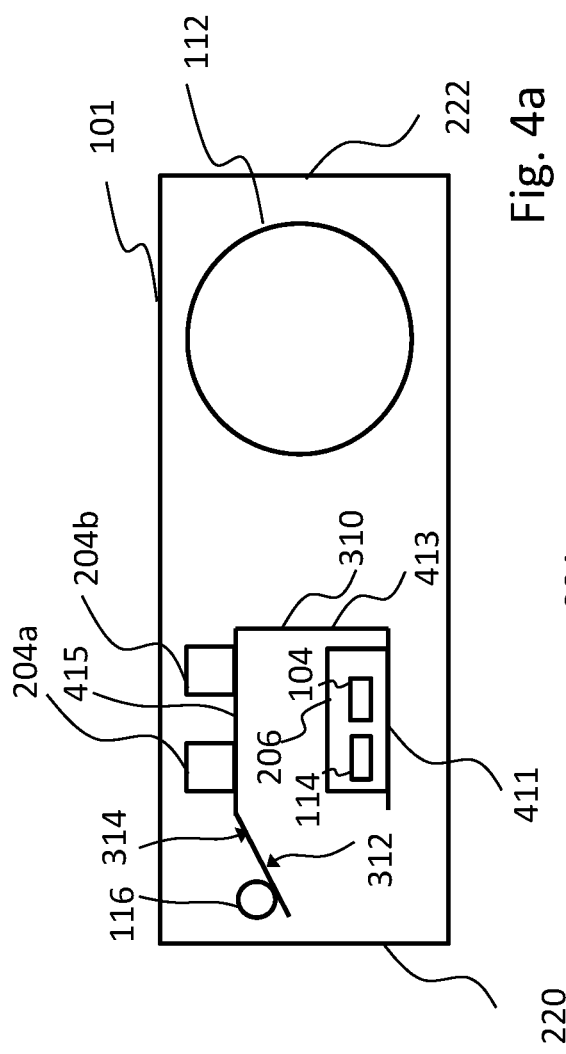
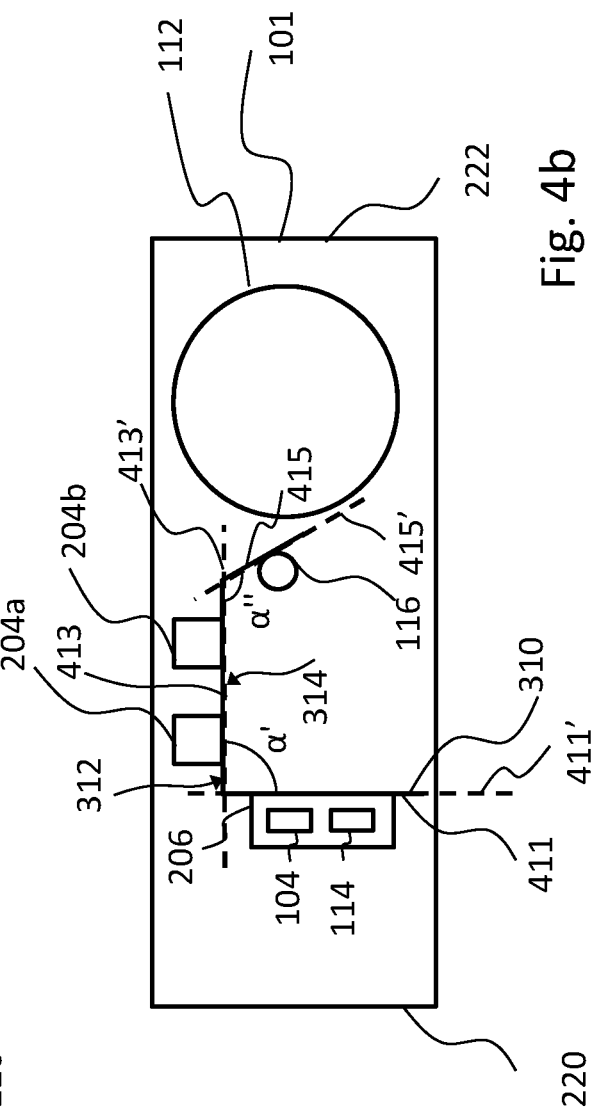

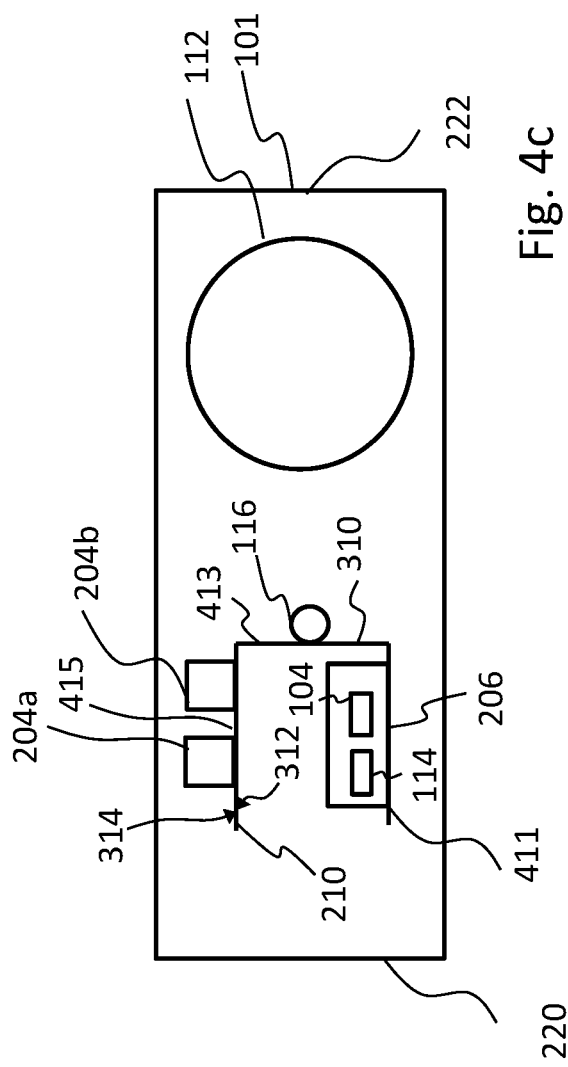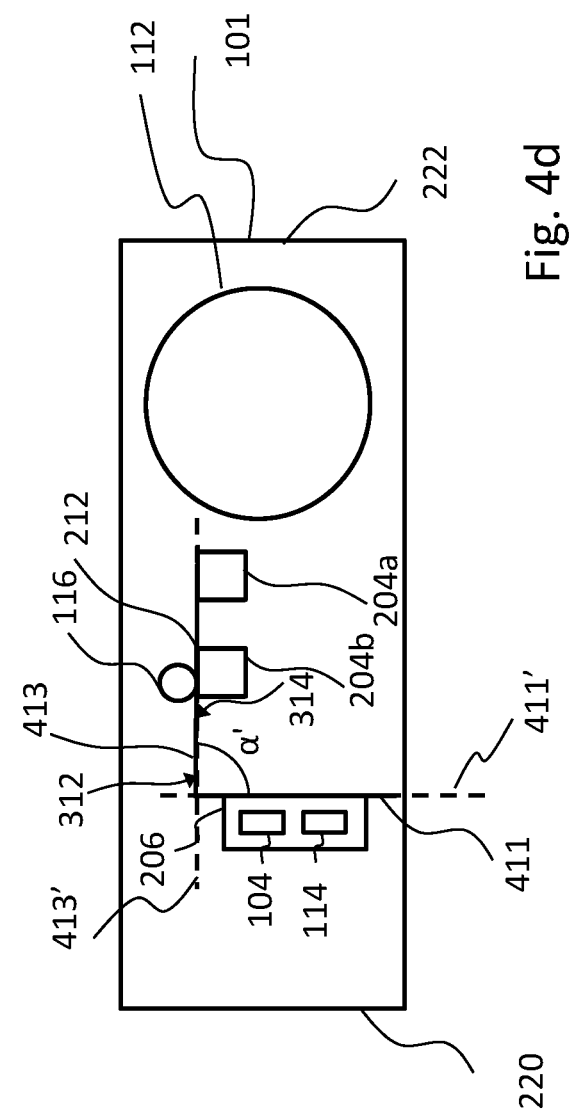

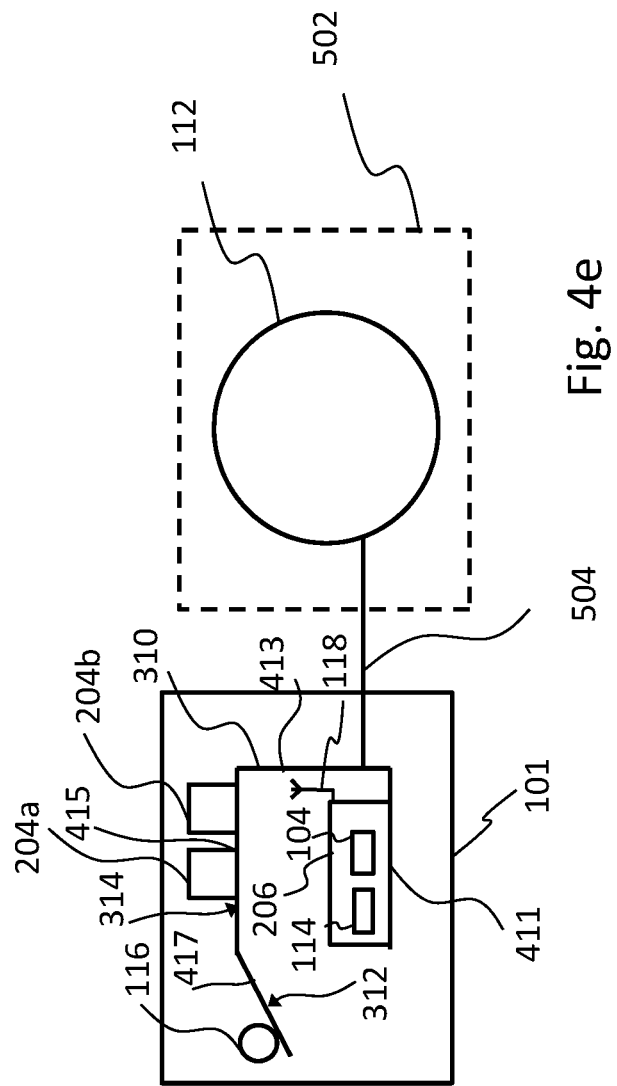

HEARING DEVICE WITH AN ANTENNA

RELATED APPLICATION DATA

This application claims priority to, and the benefit of, European Patent Application No. 18209631.3 filed on Nov. 30, 2018. The entire disclosure of the above application is expressly incorporated by reference herein.

FIELD

The present disclosure relates to hearing devices, more particularly to hearing devices for compensating a hearing loss of a user, particularly hearing devices having wireless communication capabilities and thus hearing devices comprising antennas for communication.

The present disclosure further relates to a hearing device configured to communicate using magnetic induction. The hearing device may be used in a binaural hearing device system. During operation, the hearing device may be worn in the ear of a user for alleviating a hearing loss of the user.

BACKGROUND

Hearing devices are very small and delicate devices and comprise many electronic and metallic components contained in a housing or shell small enough to fit in the ear canal of a human or be located behind the outer ear. The many electronic and metallic components in combination with the small size of the hearing device housing or shell impose high design constraints on design of the hearing devices and particular on the communication means to be used in hearing devices with wireless communication capabilities.

Moreover, antennas in the hearing device must be designed to achieve a satisfactory performance despite these limitations and other narrow design constraints imposed by the size of the hearing device.

The developments within wireless technologies for hearing devices and the continuous efforts to make hearing devices smaller and more cost effective to manufacture has led to the use of flexible carriers incorporating one or more antennas in hearing devices.

Still further, in binaural hearing device systems, the requirements to the quality of the communication between the hearing devices in the binaural hearing device system are ever increasing, and include demands for low latency and low noise, increasing the requests for effective antennas in the hearing devices.

All these demands are difficult to solve with existing devices, as the present communication capabilities are insufficient.

SUMMARY

It is an object to provide a hearing device allowing for communication using magnetic induction.

It is also an object to improve the wireless communication capabilities, such as improved wireless communication capabilities between two hearing devices worn in or behind opposite ears of the user.

Radio connectivity between hearing devices allows for advanced binaural signal processing when the important ear-to-ear (E2E) link is ensured. Furthermore, the hearing devices may be connected to a plethora of accessories, either body-worn or being placed in the user's proximity, and hence to the Internet as part of the so-called Internet-of-things (IoT). However, it is challenging but of key importance to ensure a stable E2E link. The E2E link is particularly demanding in terms of requirements on the communication means and performance of links. In fact, to achieve a good on-body performance radiation efficiency, bandwidth and radiation pattern should be optimized with respect to each other, while the physical volume available for the design is extremely reduced, as most times space comes at a premium in wearable devices such as hearing devices, in particular in-the-ear (ITE) hearing devices. Furthermore, mass production and industrial design needs provide a desire that the communication means are low-profile, lightweight, and inexpensive to manufacture. More overall constrains may also be relevant, particularly the fact that the hearing device radios operate in an ultra-low-power regime. Another issue threatening communication efficiency may be the small volume available for the design, as this necessarily brings the communication means in close physical, hence, as well as electromagnetic, proximity of other parts of the device, with a strong likelihood of coupling to them.

Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue. However, magnetic induction systems, including magnetic induction coils and magnetic induction control chips, are sensitive to electromagnetic emissions from other elements in the hearing device.

In accordance with the present disclosure, the above-mentioned and other objects are obtained by the disclosed hearing device.

According to an aspect, a hearing device is disclosed, the hearing device comprises one or more electronic components. The one or more electronic components may include a magnetic induction control chip and a signal processor. In some embodiments, at least some of the one or more electronic components are provided as a multi-chip assembly. In some embodiments, the multi-chip assembly includes a magnetic induction control chip and a signal processor. The hearing device may comprise one or more microphones configured to receive an audio signal. The one or more microphones may be provided at a carrier board, and may for example be mounted onto the carrier board. A magnetic induction coil may also be provided at the carrier board, and may for example be mounted onto the carrier board. The hearing device further comprises a battery for supplying power. The hearing device comprises a hearing device housing, the hearing device housing having a first end and a second end, the second end being opposite the first end, wherein the battery may be provided closer to the second end of the hearing device housing than to the first end of the hearing device housing, and wherein the multi-chip assembly and the magnetic induction coil may be provided in the hearing device housing between the battery and the first end of the hearing device housing. In some embodiments, the multi-chip assembly and the magnetic induction coil may be provided in the hearing device housing between a center axis of the battery and the first end of the hearing device housing.

In some embodiments, the hearing device comprises a microphone configured to receive an audio signal, and the audio signal is provided to a signal processor configured to process the audio signal for compensating a hearing loss of a user. The signal processor may comprise elements such as amplifiers, compressors and noise reduction systems, etc. for processing the audio signal to compensate a hearing loss of a user.

The multi-chip assembly may be any assembly of integrated circuits, semiconductor dies and/or other discrete electronic components. The multi-chip assembly comprises two or more electronic components integrated in the assembly. The electronic components may be provided as "bare dies"; however it is envisaged that some, or all, electronic components of the multi-chip assembly may be pre-packaged while other, or none, of the electronic components of the multi-chip assembly may be mounted as bare dies or chips or vice versa. The multi-chip assembly may be referred to as a hybrid multi-chip assembly as a number of electronic components are inter-connected. The multi-chip assembly may comprise a multi-layered structure for accommodating at least some of the hearing device electric components. The multi-chip assembly may comprise a multi-layered printed circuit board. The electronic components are integrated and mounted onto a substrate so that the multi-chip assembly may be handled as a single assembly comprising multiple electronic components. In some embodiments, the multi-chip assembly is provided as a single component for mounting in a hearing device.

The multi-chip assembly may comprise the signal processor and the magnetic induction control chip. In some embodiments, the magnetic induction control chip is an integrated circuit implementing magnetic induction transmit and receive functions, such as magnetic induction transmit and receive control functions. The magnetic induction control chip is interconnected to the magnetic induction coil e.g. via electrical wires or via electrical conductive traces on a support substrate. The hearing device comprising the magnetic induction control chip and the magnetic induction coil is being configured to communicate using magnetic induction, such as using near-field magnetic induction. The magnetic induction control chip is configured to control power supply to the magnetic induction coil. Even though the present disclosure refers to multi-chip assembly throughout, it is envisaged that the one or more electronic components may also be provided in an alternative way, e.g. separately, at one or more circuit boards, etc.

In some embodiments, the magnetic induction control chip is configured to apply any modulation schemes including amplitude modulation, phase modulation, and/or frequency modulation to the data signal to be communicated via magnetic induction so that data are modulated onto the magnetic field emitted from the magnetic induction coil. The magnetic induction control chip may comprise circuits, such as circuits implementing low noise amplifies (LNA), mixers and filters. The magnetic induction control chip may also comprise peripheral digital blocks such as frequency dividers, codec blocks, demodulators, etc.

In some embodiments, the magnetic induction coil is furthermore configured for receiving a magnetic field communicated by another electronic device, such as via a magnetic induction coil of another electronic device, and providing the received data signal to the magnetic induction control chip. The magnetic induction control chip is configured to demodulate the received signal. In some embodiments the magnetic induction control chip is configured as a transceiver. In some embodiments, the magnetic induction control chip is configured to receive and transmit data at a particular frequency.

The data communicated may include data, audio, voice, settings, information, etc.

The hearing device comprises a hearing device housing. In some embodiments, the hearing device housing comprises hearing device electronic components. In some embodiments, the hearing device housing comprises the multi-chip assembly including the magnetic induction control chip and the signal processor, the one or more microphones and the magnetic induction coil. The hearing device housing further comprises a battery for supplying power, such as a rechargeable battery.

The hearing device housing has a first end and a second end, the second end being opposite the first end, transversely and/or longitudinally. The battery is provided closer to the second end than to the first end, and the multi-chip assembly and the magnetic induction coil is provided in the hearing device housing between the battery, such as between a center axis of the battery, and the first end of the hearing device housing. The battery may have a first side and a second side.

It is an advantage of providing the multi-chip assembly and the magnetic induction coil at the same side of the battery as this eliminates the need for providing electronic components at both sides of the battery. Typically, the magnetic induction coil has been provided between the battery and the second end of the hearing device housing thus taking up space in the second end of the hearing device housing. Furthermore, such positioning requires that electrical connections are provided from one side of the battery to the other side of the battery. Thus, by providing also the magnetic induction coil between the battery and the first end, the size of the hearing device housing may be reduced.

In some embodiments, a distance from a centre axis of the battery to the second end is shorter than a distance from the centre axis of the battery to the first end. In some embodiments, the battery is provided closer to the second end of the hearing device housing than to the first end. In some embodiments, a distance from a centre axis of the battery to the second end is larger than a distance from the centre axis of the battery to the first end.

The battery may be any type of battery. The battery may be a flat battery, such as a button shaped battery. The battery may be circular. The battery may be a disk-shaped battery. The center axis for a flat battery may be an axis through a center of the flat side of the battery.

In some embodiments, the one or more microphones are provided between the battery and the first end of the hearing device housing. In some embodiments, the one or more microphones and the multi-chip assembly are positioned between the battery and the magnetic induction coil. In some embodiments the magnetic induction coil is provided closer to the first end than the one or more microphones and the multi-chip assembly.

The one or more microphones and the magnetic induction coil are provided at a carrier board, and may be mounted onto the carrier board. The one or more microphones and the magnetic induction coil may be mounted onto the carrier board in any conventional way. Typically, electrical conductors are also provided in and/or on the carrier board.

The carrier board may be comprised by a flexible board, such as a flexible printed circuit board, or any other carrier board capable of carrying the electronic components. In some embodiments, the carrier board is formed in one part. In some embodiments, the carrier board is formed of a number of sub-carrier boards, the sub-carrier boards being interconnected with short wires or conductive parts.

In some embodiments, the carrier board comprises an electromagnetic shielding layer. The electromagnetic shielding layer may be a coated layer, such as a layer coated by a conductive coating, such as copper, such as conductive ink, the electromagnetic shielding layer may be a metallic layer, such as a sheet metal layer, etc. In some embodiments, the electromagnetic shielding layer is provided at at least a part of the carrier board so that at least a part of the carrier board comprises an electromagnetic shielding layer. In some embodiments, the electromagnetic shielding layer is provided as one or more layers in a multi-layered carrier board, such as a multi-layered printed circuit board or flexible printed circuit board.

In some embodiments, the carrier board is configured to form an electromagnetic shield between the multi-chip assembly and the one or more microphones.

In some embodiments, the carrier board is configured to form an electromagnetic shield between the multi-chip assembly and the magnetic induction coil.

In some embodiments, at least the part of the carrier board at which the magnetic induction coil is positioned is configured to provide an electromagnetic shield between the magnetic induction coil and the multi-chip assembly. At least the part of the carrier board at which the magnetic induction coil is positioned comprises the electromagnetic shielding layer.

In some embodiments, the magnetic induction coil is provided at the first side of the battery; the multi-chip assembly is provided at the first side of the battey, and the carrier board provides an electromagnetic shield between the multi-chip assembly and the magnetic induction coil.

By using the carrier board as electromagnetic shield, the multi-chip assembly, comprising e.g. both the magnetic induction control chip and the signal processor, can be provided at a same side of the battery as the magnetic induction coil.

In some embodiments, the battery is interconnected with the carrier board to supply power to the one or more microphones and the supply lines are provided as conductive traces at the carrier board to supply power from the battery to the one or more microphones.

In some embodiments, the magnetic induction coil has a longitudinal direction being parallel to an ear-to-ear axis of a user of the hearing device, when the hearing device is provided in the intended operational position at the ear of a user. In some embodiments, the magnetic induction coil has a longitudinal extension in a direction being parallel to, or being substantially parallel to, or being 0/180 degrees +/−35 degrees, to an ear-to-ear axis of a user, when the hearing device is worn in its operational position during use. The longitudinal direction of the magnetic induction coil being the axis along which coil windings of the magnetic induction coil are provided In some embodiments, the battery is a rechargeable battery, and the hearing device further comprises a re-chargeable battery controller; the re-chargeable battery controller forming part of the multi-chip assembly.

In some embodiments, the multi-chip assembly is provided at the carrier board. The multi-chip assembly may be mounted onto the carrier board.

In some embodiments, the carrier board has a first side and a second side, and the multi-chip assembly is arranged at the first side of the carrier board and the magnetic induction coil is arranged at the second side of the carrier board.

In some embodiments, the carrier board provides a shield between the multi-chip assembly. In some embodiments, the carrier board comprises an additional electromagnetic shielding layer increasing the electromagnetic shielding properties of the carrier board.

In some embodiments, the multi-chip assembly being arranged at the first side of the carrier board and the magnetic induction coil being arranged at the second side of the carrier board are provided at a same section of the carrier board.

In some embodiments, the carrier board has a first section extending in a first plane and a second section extending in a second plane, wherein the first plane forms a first angle with the second plane, and wherein the multi-chip assembly is arranged at the first section of the carrier board and the magnetic induction coils is arranged at the second section of the carrier board. The multi-chip assembly and the magnetic induction coil are arranged so that the carrier board being forms an electromagnetic shield between the magnetic induction coil and the multi-chip assembly.

In some embodiments, the carrier board has a first section extending in a first plane, a third section extending in a third plane, the third plane being parallel with the first plane, the first and third sections being interconnected by a second section, and wherein the multi-chip assembly is arranged at the first section of the carrier board and the one or more microphones and/or the magnetic induction coil are arranged at the third section of the carrier board. The multi-chip assembly and the magnetic induction coil are arranged so that the carrier board forms an electromagnetic shield between the magnetic induction coil and the multi-chip assembly.

For example, the multi-chip assembly may be arranged at the first side of the carrier board in the first section of the carrier board and the one or more microphones and/or the magnetic induction coil may be arranged at the second side of the carrier board in third section of the carrier board. The first side of the carrier board may in the first section face the first side of the carrier board in the third section.

In some embodiments the carrier board has a first section extending in a first plane, a third section extending in a third plane, the first and third sections being interconnected by a second section. The third plane being provided displaced relative to the first plane; the third plane may be parallel to the first plane. The multi-chip assembly is arranged at the first section of the carrier board, the one or more microphones are arranged at the third section of the carrier board, the carrier board having a fourth section, wherein the fourth section extends from the third section so that the fourth section is bent in a direction towards the first plane, and wherein the magnetic induction coil is provided at the fourth section of the carrier board.

In some embodiments, the fourth section forms an angle larger than zero with the third section, such as an obtuse angle, such as an angle between 130 and 150 degrees.

In some embodiments, the carrier board is configured to form an electromagnetic shield between the magnetic induction coil and the multi-chip assembly. For a magnetic induction coil and corresponding magnetic induction control chip operating at a frequency below 100 MHz or below 10 MHz, it is advantageous that an electromagnetic shield is provided between the induction coil and multi-chip assembly comprising the hearing device electric components, as the magnetic induction coil operating at such frequencies is susceptible to noise originating from the hearing device electric components at such frequencies.

The magnetic induction coil being connected to the magnetic induction control chip may be configured to operate at a frequency below 100 MHz, such as at below 30 MHz, such as below 15 MHz, during use. The magnetic induction coil being connected to the magnetic induction control chip may be configured to operate in a frequency range between 1

MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

However, it is envisaged that the hearing device as herein disclosed is not limited to operation in such a frequency band, and the hearing device may be configured for operation in any frequency band.

In some embodiments, the magnetic induction antenna is configured to communicate with another hearing device of a binaural hearing device.

In some embodiment the hearing device further comprises a wireless communication unit interconnected with an RF antenna for emission and reception of an electromagnetic field in a radio frequency range. The wireless communication unit may be provided between the battery and the first end of the hearing device housing. In some embodiments, the RF antenna is provided between the battery and the first end of the hearing device housing. In some embodiments, the wireless communication unit may be provided as part of the multi-chip assembly.

The wireless communication unit may be configured for communicating with another electronic device. The data communicated via the wireless communication unit may include data, audio, voice, settings, information, etc.

It is an advantage that by one or more embodiments as presented, an RF antenna and a magnetic induction coil may be provided in the hearing device. To have an RF antenna and a magnetic induction coil provided in the hearing device increases the wireless communication capabilities of the hearing device. By providing the wireless communication unit as part of the multi-chip assembly and by providing an electromagnetic shield in the form of a carrier board between the multi-chip assembly and the magnetic induction coil reduces any electromagnetic interference between the components. By using the carrier board as electromagnetic shield reduces the need for an increased size of hearing device which has previously been required to obtain sufficient shielding between the components.

In some embodiments, the carrier board, such as the carrier board including an additional shielding layer reduces unwanted electromagnetic radiation from the multi-chip assembly in reaching the magnetic induction coil, and vice-versa. In some embodiments, the unwanted electromagnetic radiation includes noise, in some embodiments, the unwanted electromagnetic radiation includes noise from ripple effects of power management units.

Furthermore, in present day communication systems, numerous different communication systems communicate at or about 2.4 GHz, and thus there is also a significant environmental electromagnetic noise in the frequency range at or about 2.4 GHz. It is an advantage of some of the presented embodiments that for some applications for which the noise may be acceptable, for example for data communication, the RF antenna may be used. For other applications, in which a high noise level may impact the transmission significantly, a magnetic induction coil may be used. For example, the magnetic induction coil may be used for streaming of audio.

In some embodiments, the RF antenna is configured for data communication at a first bit rate. In some embodiments, the magnetic induction coil is configured for data communication at a second bit rate, the second bit rate being larger than the first bit rate, such as by a factor 10, such as by a factor 30, a factor 50, a factor 100, etc.

It is an advantage of using magnetic induction that typically low latency may be obtained. Especially when streaming audio, it is of importance to keep the latency low, to avoid delays noticeable by a user. Typically, a delay of less than 100 ms, such as of less than 50 ms, such as of less than 25 ms, such as of less than 10 ms, such as of less than 5 ms, such as of less than 1 ms, may be obtained by use of magnetic induction for communication.

It is a further advantage of using magnetic induction for example for communicating between a first hearing device and a second hearing device in a binaural system that for the low frequencies, i.e. typically below 100 MHz, and corresponding long wavelengths, the head is not considered as a significant obstacle for the electromagnetic radiation emitted by the magnetic induction coil, thus, the reduction of electromagnetic radiation due to tissue absorption is reduced when the frequency is reduced.

In some embodiments, magnetic induction coil may have an impedance larger than a threshold inductance, such as an inductance larger than 2 pH, such as an inductance larger than 3 pH, such as larger than 3.5 pH, such as about 3.9 pH or an inductance of up to 5 pH. The inductance may be selected to be between 2 pH and 5 pH, such as between 3 pH and 4 pH.

In some embodiments, the magnetic induction antenna is configured to communicate with another hearing device of a binaural hearing device.

In some embodiments, the hearing device is an ITC hearing device type, a CIC hearing device type, a BTE hearing device type, a hearing protection device, or any combination of the types. The hearing device may be a behind-the-ear hearing device. The hearing device may be provided as a behind-the-ear module. The hearing device may be an in-the-ear hearing device, such as a completely-in-the-canal hearing device. The hearing device may be provided as an in-the-ear module. Alternatively, parts of the hearing device may be provided in a behind-the-ear module, while other parts, such as the receiver, may be provided in an in-the-ear module. The hearing device may be a receiver-in-the-ear hearing device.

According to a further aspect, a binaural hearing device system is disclosed, the binaural hearing device system comprising a first hearing device and a second hearing device configured to be provided at a first ear (e.g. left ear) and a second ear (e.g. right ear) of the user, respectively, and wherein one or both of the hearing devices is/are a hearing device as herein disclosed.

In some embodiments, the hearing device further comprises an RF antenna.

The hearing device comprises a wireless communications unit configured for wireless data communication. The wireless communication unit may comprise a transmitter, a receiver, a transmitter-receiver pair, such as a transceiver, a radio unit, etc. The wireless communication unit may be configured for communication using any protocol as known for a person skilled in the art, including Bluetooth, including Bluetooth Low Energy, Bluetooth Smart, etc., WLAN standards, manufacturer-specific protocols, such as tailored proximity antenna protocols, such as proprietary protocols, such as low-power wireless communication protocols, such as low-power wireless communication protocols, such as CSR mesh, etc., RF communication protocols, magnetic induction protocols, etc. The one or more wireless communication units may be configured for communication using same communication protocols, or same type of communication protocols, or the one or more wireless communication units may be configured for communication using different communication protocols.

In some embodiments the RF antenna is an electrical antenna. In some embodiments, the RF antenna is a monopole antenna. In some embodiments, the RF antenna is a resonant antenna, such as an RF antenna configured to emit and/or receive an electromagnetic field in a wavelength range about a resonance frequency.

The frequency band may be an RF frequency band comprising a frequency selected from the following frequencies, such as comprising 433 MHz, 800 MHz, 915 MHz, 1800 MHz, 2.4 GHz, 5.8 GHz, etc. Thus, the RF frequency band may be selected as an ISM band, such as a GSM band or a WLAN band comprising any one or more of these frequencies. In some embodiments, the frequency band may be +/−100 MHz around the selected frequency.

The RF antenna functionality may be implemented for operation at a frequency of at least 400 MHz, such as at a frequency of between 800 MHz and 6 GHz.

The wireless communication unit and the RF antenna may be configured for operation in an ISM frequency band. Preferably, the RF antenna is configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc.

However, it is envisaged that the hearing device as herein disclosed is not limited to operation in such a frequency band, and the hearing device may be configured for operation in any frequency band.

The processing unit is configured for providing a processed audio signal. The term sound and/or the term acoustic output may be understood to be an audio signal. Thus, the microphone may be configured to receive sound or an audio signal. An output transducer or speaker/receiver may be configured to provide or transmit an acoustic output or a processed audio signal, such as the processed audio signal provided by the processing unit. The acoustic output or processed audio signal may be provided or transmitted to an ear of the user wearing the hearing device during use.

It will be appreciated that the speaker of a hearing device is also known in the art as a "receiver". The term speaker is used herein to avoid confusion with other hearing device components.

The present disclosure relates to different aspects including the hearing device described above and in the following, and corresponding hearing devices, binaural hearing devices, hearing devices, hearing devices, systems, methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
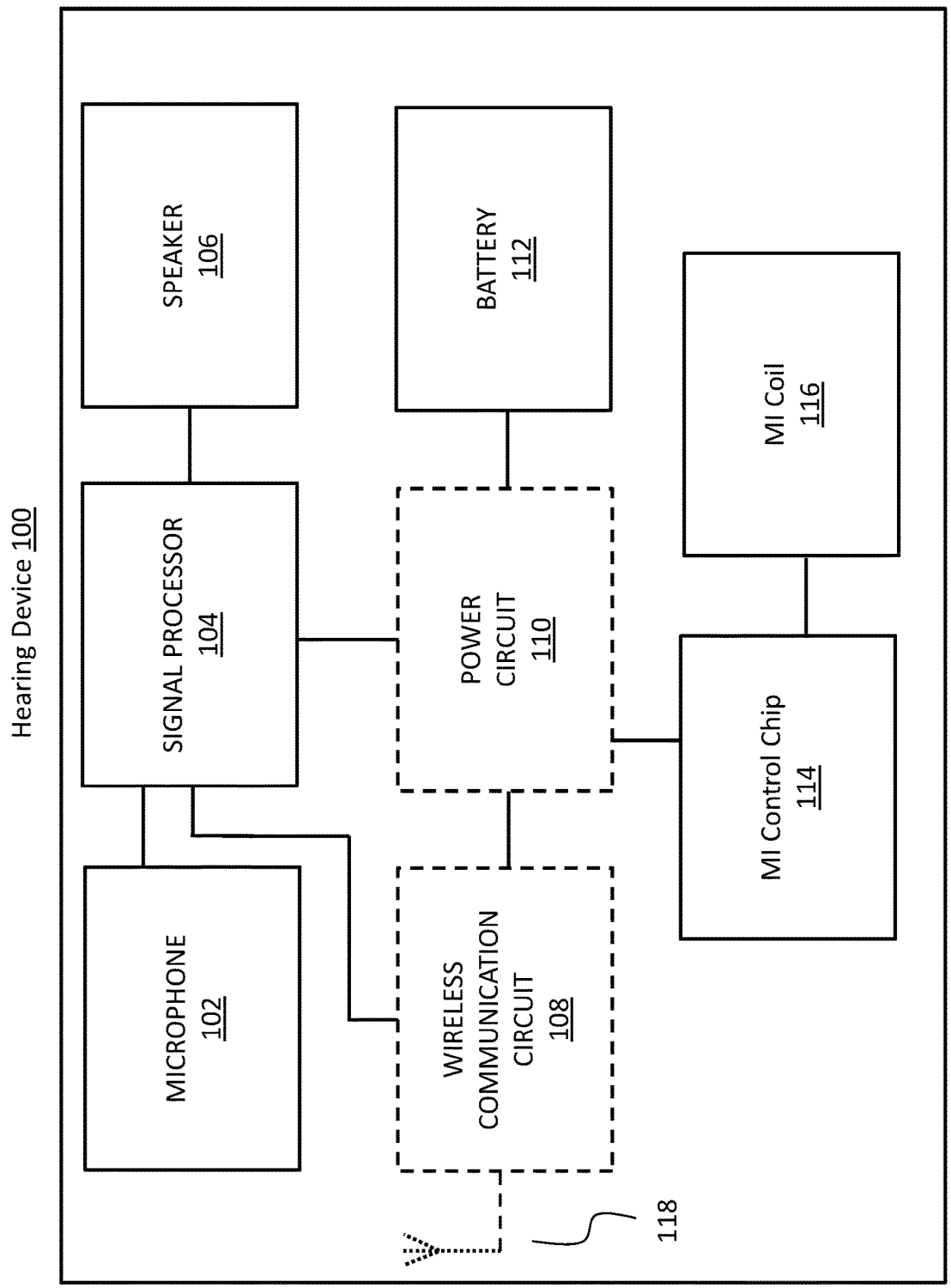
FIG. 1 schematically illustrates an example of components in hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

The claimed invention may be embodied in different forms and should not be construed as limited to the embodiments set forth herein.

A block-diagram of an embodiment of a hearing device 100 is shown in FIG. 1. The hearing device 100 comprises a first transducer, i.e. microphone 102, to generate one or more microphone output signals based on a received an audio signal. The one or more microphone output signals are provided to a signal processor 104 for processing the one or more microphone output signals. A receiver or speaker 106 is connected to an output of the signal processor 104. The signal processor 104 is configured for converting the output of the microphone 102 into a signal modified to compensate for a user's hearing impairment, and to provide the modified signal to the speaker 106. The speaker 106 is configured for providing an audio output based on the modified signal from the signal processor 104.

The hearing device signal processor 104 may comprise elements such as an amplifier, and/or a compressor and/or a noise reduction system, etc. The hearing device may have a filter function, such as compensation filter for optimizing the modified signal from the signal processor 104. In some embodiments, the filter function is comprised in the signal processor. The hearing device further comprises a magnetic induction control chip 114 interconnected with magnetic induction coil 116. The hearing device 100 further comprises a power source 112, such as a battery, such as a rechargeable battery. The power source 112 may be connected directly to the signal processor 104 and the magnetic induction control chip 114. Optionally, a power circuit 110 is provided for controlling the power provided from the battery 112 to the signal processor 104 and the magnetic induction (MI) control chip 114. The battery 112 has battery contacts 216 interconnecting the battery and the power circuit 110. The magnetic induction coil is configured for communication with one or more external electronic devices. In some embodiments the magnetic induction coil is configured for communication with another hearing device, such as another hearing device located at another ear, typically in a binaural hearing device system.

The hearing device may optionally furthermore have a wireless communication unit 108, such as a wireless communication circuit, for wireless data communication interconnected with an RF antenna 118 for emission and reception of an electromagnetic field. The wireless communication unit 108, including a radio or a transceiver, connect to the hearing device signal processor 104 and the RF antenna 118, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device, located at another ear, typically in a binaural hearing device system.

Figure 2:
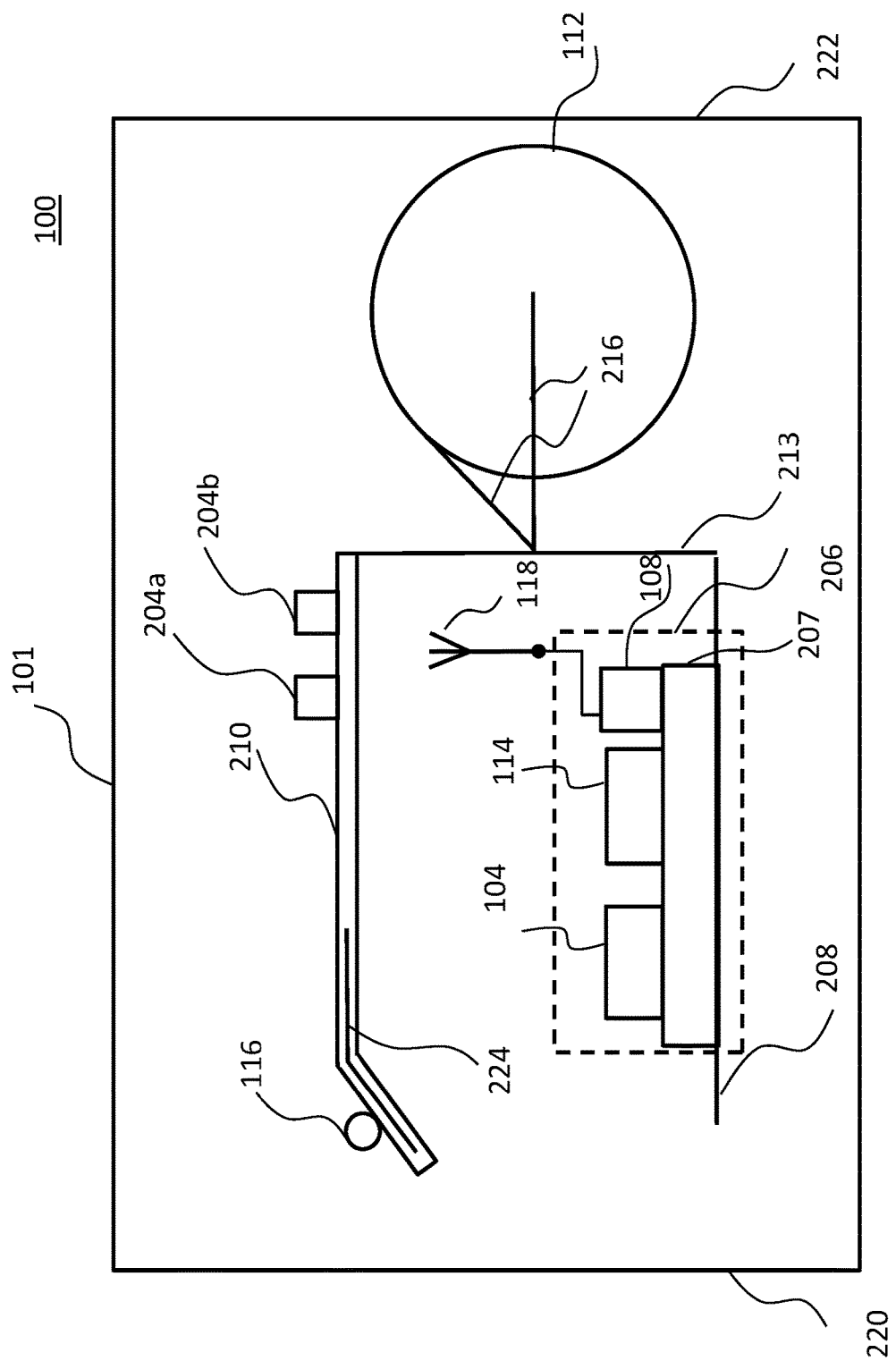
FIG. 2 schematically illustrates the components in the hearing device in more detail, FIGS. 3a-3b schematically illustrates an exemplary hearing device provided in a hearing device housing, FIGS. 4a-4e schematically illustrates the positioning of components in a hearing device.

FIG. 2 schematically illustrates the positioning of electronic components of the hearing device. The hearing device 100 may comprise a multi-chip assembly 206 including a magnetic induction control chip 114 and a signal processor 104. The hearing device may comprise one or more microphones 204a, 204b configured to receive an audio signal. The one or more microphones 204a, 204b may be provided at a first carrier board 210, and may for example be mounted onto the first carrier board 210. A magnetic induction coil 116 may also be provided at the first carrier board 210, and may for example be mounted onto the first carrier board 210. The hearing device 100 further comprises a battery 112 for supplying power.

The hearing device 100 comprises a hearing device housing 101, the hearing device housing 101 having a first end 220 and a second end 222, the second end 222 being opposite the first end 220. In some embodiments, the first end faces a look direction of a user when the hearing device is worn by the user. The battery 112 may be provided closer to the second end 222 of the hearing device housing 101 than to the first end 220 of the hearing device housing 101. The multi-chip assembly 206 and the magnetic induction coil 116 may be provided in the hearing device housing 101 between the battery 112, such as between a center axis of the battery, and the first end 220 of the hearing device housing 101.

The magnetic induction coil 116 may be provided at the same first carrier board 210 as the one or more microphones 204a, 204b. An electrical interconnection 213 may be made between the multi-chip assembly 206 and the first carrier board 210. In some embodiments, the electrical interconnection is made with wires, such as litzes. In some embodiments, the electrical interconnection is provided as conductive traces on another carrier board.

The first carrier board 210 may be positioned between the magnetic induction coil 116 and the multi-chip assembly 206 in such a way that the first carrier board 210 provides an electromagnetic shield between the magnetic induction coil 116 and the multi-chip assembly 206. In some embodiments, the carrier board 210 comprises an electromagnetic shielding layer 224 increasing the electromagnetic shielding of the magnetic induction coil 116 from any electromagnetic noise stemming from the multi-chip assembly 206. The multi-chip assembly 206 may be provided at second carrier board 208. In some embodiments, the multi-chip assembly 206 comprises a multi-chip assembly substrate 207, such as a printed circuit board, such as a flexible printed circuit board, and electronic hearing device components are mounted onto the multi-chip assembly substrate 207 or comprised by the multi-chip assembly substrate 207. The MI control chip 114, and the signal processor 104 may be mounted onto the multi-chip assembly substrate 207. In some embodiments, also a wireless communication unit 108 is comprised by the multi-chip assembly. The wireless communication unit may be interconnected with RF antenna 118.

Figure 3A:
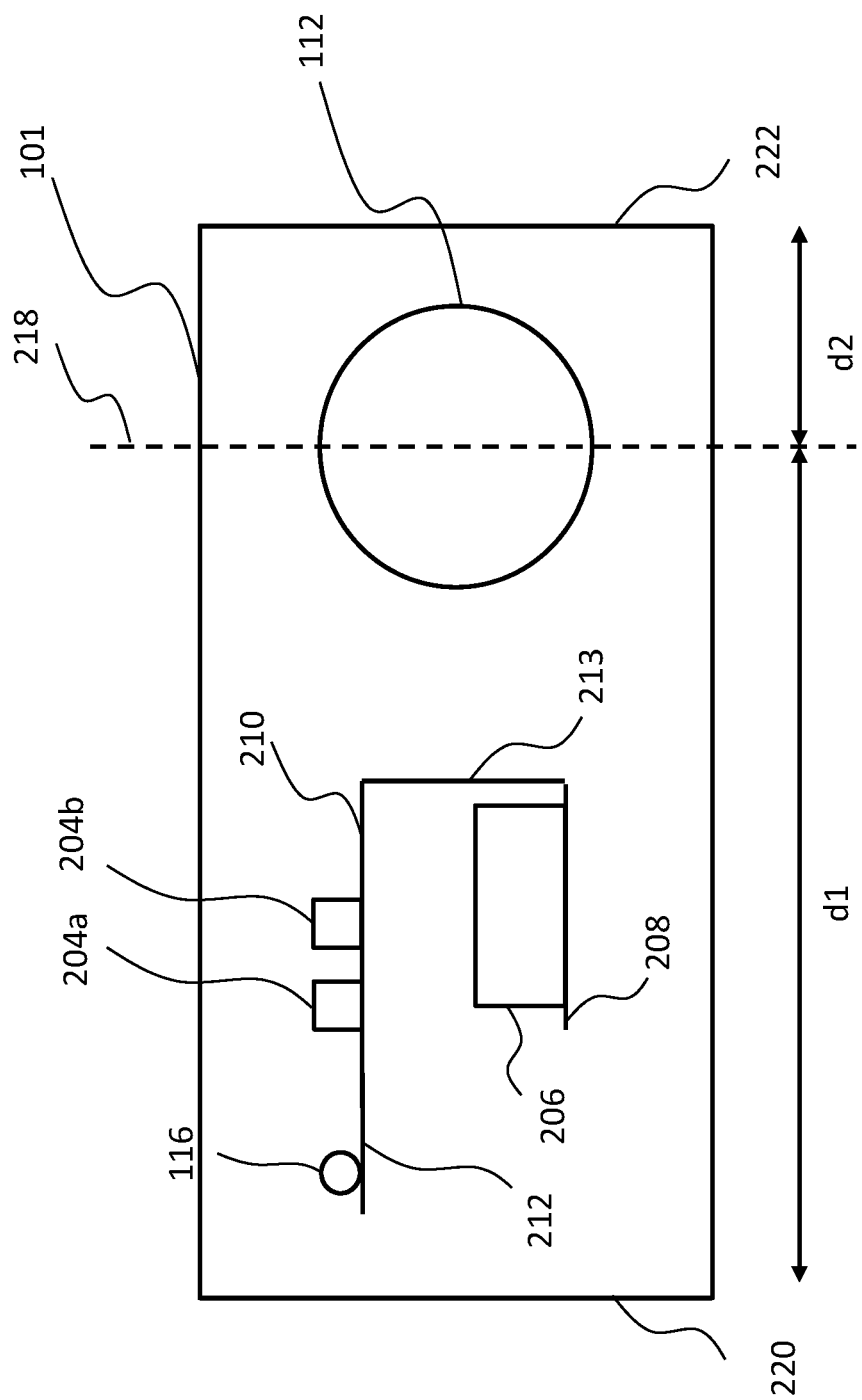

In FIG. 3a, the hearing device housing 101, the electronic components, the battery and the carrier boards are shown schematically. The multi-chip assembly 206, the magnetic induction coil 116 and the one or more microphones 204a, 204b are provided between the battery 112, such as between a center axis 218 of the battery 112, and the first end 220. The battery is provided closer to the second end 222 of the hearing device housing 101 than to the first end 220. A second distance d2 from the centre axis 218 of the battery 112 to the second end 222 is smaller than a first distance d1 from the centre axis 218 of the battery 112 to the first end 220. The multi-chip assembly is provided at a second carrier board 208.

Figure 3B:
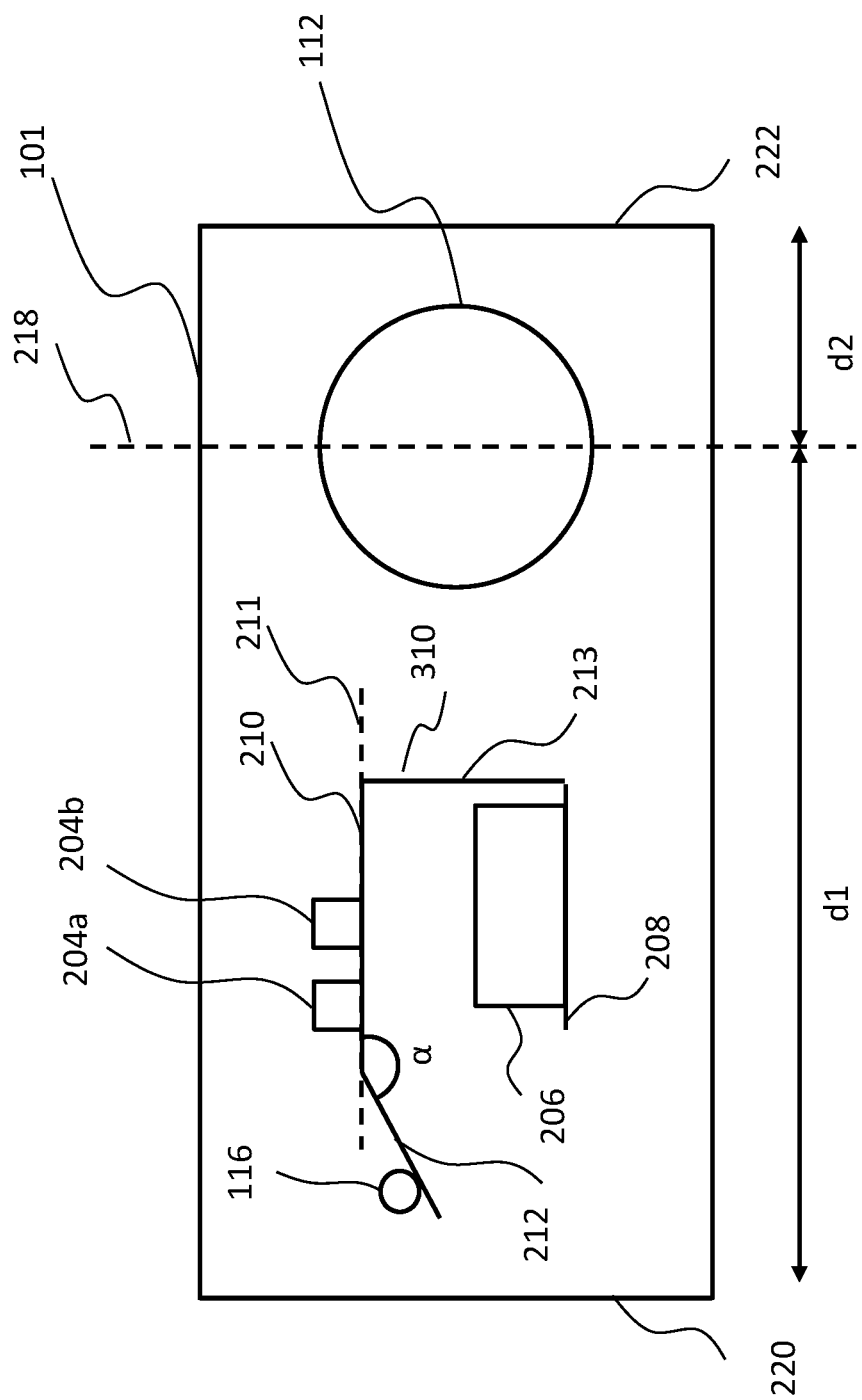

In some embodiments, the first end 220 is provided at a front end of a hearing device, such as for example at a front end of a BTE type hearing device, in which the front end is the end closest to nose of a user, when the hearing device is worn in its intended operational position behind the ear of the user. For a BTE type hearing device, the second end 222 may be a back end, i.e. the end closest to the neck of a user, when the hearing device is worn in its intended operational position behind the ear of the user. In some embodiments, the first end 220 may be oriented towards a tympanic membrane of a user, when the hearing device is worn by the user. In some embodiments, the second end 222 may be oriented towards a environment of a user, when the hearing device is worn by the user FIG. 3b corresponds to FIG. 3a, except that a part 212 of the first carrier board, such as the part 212 on which the magnetic induction coil 116 is mounted may be provided at an obtuse angle, α, with respect to an axis 211 extending through second carrier board 210. The part 212 may be bent towards the second carrier board 208. The part 212 of the first carrier board 210 is bent with respect to the first carrier board 210, such as forming an angle α of more than 90 degrees and less than 270 degrees with the axis 211 extending through the first carrier board 210, such as an angle of between 130 and 150 degrees, to provide a shielding effect between the magnetic induction coil 116 and the first and second microphones 204a, 204b.

In some embodiments, the first carrier board 210, including the part 212, the second carrier board 208 and the part 213 providing the electrical interconnection between the second carrier board 208 and the first carrier board 210, are formed as a single carrier board 310. The carrier board may be a flexible carrier board, such as a flexible printed circuit board. The carrier board may be bent so as to obtain the desired geometry of the carrier board, or the desired configuration of the carrier board.

In FIGS. 4a-e, a number of different configurations are illustrated. The multi-chip assembly 206 comprising the signal processor 104 and the magnetic induction control chip 114 is provided at a first side 312 of the carrier board 310. The one or more microphones 204a, 204b or the magnetic induction coil are provided at a second side 314 of the carrier board.

In FIG. 4a, the multi-chip assembly is provided at the first side 312 of the carrier board 310 and one or more microphones 204a, 204b and the magnetic induction coil are provided at the second side 314 of the carrier board 310. The carrier board 310 is bent around and over the multi-chip assembly 206, to form a compact unit. The magnetic induction coil 116 is provided at the second side 314 of the carrier board 310 over the multi-chip assembly.

In FIG. 4a, a hearing device is illustrated in which the carrier board 310 has a first section 411 extending in a first plane, a third section 415 extending in a third plane, the third plane being parallel with the first plane. In some embodiments, the third plane is substantially parallel with the first plane, i.e. an axis extending perpendicular from the first plane will intersect the third plane at an angle being substantially 90 degrees, such as at an angle of 85-95 degrees or 80-100 degrees. The first 411 and third 415 sections may be interconnected by a second section 413, and wherein the multi-chip assembly is arranged at the first section 411 of the carrier board and the one or more microphones and/or the magnetic induction coil are arranged at the third section of the carrier board. The second section 413 providing electrical interconnection between the first section 411 and the third section 415, such as between the multi-chip assembly 206 and the one or more microphones 204a, 204b and/or the magnetic induction coil 116.

As is seen in FIG. 4a, the first side 312 of the carrier board 310 in the first section 411 faces the first side 312 of the carrier board 310 in the third section 415. The carrier board 310 may be bent to obtain this.

As is seen in FIG. 4b, the carrier board 310 has a first section 411 extending in a first plane and a second section 413 extending in a second plane, wherein the first plane forms a first angle α' with the second plane, and wherein the multi-chip assembly is arranged at the first section of the carrier board and the one or more microphones 204a, 204b are provided at the second section 413 of the carrier board. In an embodiment, the first angle α' may be between 80-100 degrees, such as between 85-95 degrees, such as 90 degrees, The carrier board 310 further has a third section 415 provided at a second angle α" with respect to a second plane 413' extending through second section 413. In an embodiment, the second angle α" may be between 80-110 degrees, such as between 85-95 degrees, such as 90 degrees, The magnetic induction coil 116 may be provided at the third section 415 of the carrier board, such as at the second side 314 of the carrier board. As illustrated the multi-chip assembly 206 and the magnetic induction coil 116 may be provided at different sides 312, 314 of the carrier board 310 and in different sections 411 and 415. It is envisaged that the magnetic induction coil 116 may also be provided at the first side 312 of the carrier board 310, in the third section. The carrier board 310 will provide an electromagnetic shield between the multi-chip assembly 206 and the magnetic induction coil 116 in both cases.

As is seen in FIG. 4c, the carrier board 310 has a first section 411 extending in a first plane, a third section 415 extending in a third plane, the third plane being parallel with the first plane. In some embodiments, the third plane is substantially parallel with the first plane, i.e. an axis extending perpendicular from the first plane will intersect the third plane at an angle being substantially 90 degrees, such as at an angle of 85-95 degrees or 80-100 degrees. The first 411 and third 415 sections being interconnected by a second section 413, and wherein the multi-chip assembly is arranged at the first section 411 of the carrier board at the first side 312 of the carrier board and the one or more microphones are arranged at the third section of the carrier board at the second side of the carrier board 310. The magnetic induction coil 116 is provided at the second section 413 at the second side 314 of the carrier board.

It is envisaged that the magnetic induction coil 116 may also be provided at the first side 312 of the carrier board 310, in the third section. The carrier board 310 will provide an electromagnetic shield between the multi-chip assembly 206 and the magnetic induction coil 116 in both cases.

As is seen in FIG. 4d, the carrier board 310 has a first section 411 extending in a first plane 411' and a second section 413 extending in a second plane 413', wherein the first plane forms a first angle α' with the second plane 413'. In an embodiment, the first angle α' may be between 80-100 degrees, such as between 85-95 degrees, such as 90 degrees. In an embodiment, the multi-chip assembly 206 is arranged at the first section 411 of the carrier board and the magnetic induction coil is arranged at the second section 413 of the carrier board. As illustrated the multi-chip assembly 206 and the magnetic induction coil 116 may be provided at the same side 312 of the carrier board 310, in different sections 411 and 413. It is envisaged that the magnetic induction coil 116 may also be provided at the second side 314 of the carrier board 310, in the second section 413. The carrier board 310 will provide an electromagnetic shield between the multi-chip assembly 206 and the magnetic induction coil 116 in both cases.

As is seen in FIG. 4e, the carrier board 310 has a first section 411 extending in a first plane, a third section 415 extending in a third plane, the first and third sections 411, 415 being interconnected by a second section 413, and wherein the multi-chip assembly 206 is arranged at the first side 312 of the carrier board 310 in the first section 411 of the carrier board, the one or more microphones 204a, 204b are arranged at the third section 415 of the carrier board, such as on the second side 314 of the carrier board 310. The carrier board has a fourth section 417, wherein the fourth section 417 extends from the third section 415 so that the fourth section 417 is bent in a direction towards the first plane, such as towards the first section 411, and wherein the magnetic induction coil 116 is provided at the fourth section 417 of the carrier board, such as at the second side 314 of the carrier board 310. The fourth section may form an angle larger than zero with the third section, such as an obtuse angle, such as an angle between 130 and 150 degrees.

In FIG. 4e, the hearing device further optionally comprises an RF antenna 118. The antenna may be provided within the hearing device housing or may extend out of the hearing device housing.

In FIG. 4e, the battery is shown as provided external to the hearing device, such as external to the hearing device housing 101, having a connection 504 to the hearing device housing 101, such as to the carrier board 310. The battery 116 may be provided in a battery compartment 502, while the magnetic induction coil 116, the multi-chip assembly 206 and the one or more microphones 204a, 204b are provided in the hearing device housing 101.

Exemplary hearing devices are set out in the following embodiments:

1. A hearing device comprising
   a multi-chip assembly including a magnetic induction control chip and a signal processor,
   a battery for supplying power,
   a magnetic induction coil provided at the carrier board,
   wherein the hearing device comprises a hearing device housing, the hearing device housing having a first end and a second end, the second end being opposite the first end, wherein the battery is provided closer to the second end of the hearing device housing than to the first end of the hearing device housing, and wherein the multi-chip assembly and the magnetic induction coil is provided in the hearing device housing between the battery and the first end of the hearing device housing.

2. A hearing device according to embodiment 1, wherein a distance from a centre axis of the battery to the second end is shorter than a distance from the centre axis of the battery to the first end.
3. A hearing device according to any of the preceding embodiments, wherein one or more microphones are provided between the battery and the first end of the hearing device housing, and wherein the one or more microphones and the multi-chip assembly are positioned between the battery and the magnetic induction coil.
4. A hearing device according to any of the preceding embodiments, wherein the carrier board comprises an electromagnetic shielding layer.
5. A hearing device according to any of the preceding embodiments, wherein at least the part of the carrier board at which the magnetic induction coil is positioned is configured to provide an electromagnetic shield between the magnetic induction coil and the multi-chip assembly.
6. A hearing device according to any of the preceding embodiments, wherein the battery is interconnected with the carrier board to supply power to one or more microphones, and wherein supply lines are provided as conductive traces at the carrier board to supply power from the battery to the one or more microphones.
7. A hearing device according to any of the preceding embodiments, wherein the magnetic induction coil has a longitudinal direction being parallel to an ear-to-ear axis of a user of the hearing device, when the hearing device is provided in the intended operational position at the ear of a user.
8. A hearing device according to any of the preceding embodiments, wherein the battery is a rechargeable battery, and wherein the hearing device further comprises a re-chargeable battery controller; the re-chargeable battery controller forming part of the multi-chip assembly.
9. A hearing device according to any of the preceding embodiments, wherein the multi-chip assembly is provided at the carrier board.
10. A hearing device according to any of the preceding embodiments, wherein the hearing device comprises one or more microphones configured to receive an audio signal, the one or more microphones being provided at the carrier board, wherein the carrier board has a first side and a second side, and wherein the multi-chip assembly is arranged at the first side of the carrier board and the magnetic induction coil is arranged at the second side of the carrier board.
11. A hearing device according to embodiment 10, wherein the carrier board has a first section extending in a first plane and a second section extending in a second plane, wherein the first plane forms a first angle with the second plane, and wherein the multi-chip assembly is arranged at the first section of the carrier board and the magnetic induction coils is arranged at the second section of the carrier board.
12. A hearing device according to embodiment 10, wherein the carrier board having a first section extending in a first plane, a third section extending in a third plane, the third plane being parallel with the first plane, the first and third sections being interconnected by a second section, and wherein the multi-chip assembly is arranged at the first section of the carrier board and the one or more microphones and/or the magnetic induction coil are arranged at the third section of the carrier board.
13. A hearing device according to embodiment 12, wherein the first side of the carrier board in the first section faces the first side of the carrier board in the third section.
14. A hearing device according to any of embodiments 1-9, wherein the carrier board has a first section extending in a first plane, a third section extending in a third plane, the first and third sections being interconnected by a second section, and wherein the multi-chip assembly is arranged at the first section of the carrier board, one or more microphones are arranged at the third section of the carrier board, the carrier board having a fourth section, wherein the fourth section extends from the third section so that the fourth section is bent in a direction towards the first plane, and
wherein the magnetic induction coil is provided at the fourth section of the carrier board.
15. A hearing device according to embodiment 14, wherein the fourth section forms an angle larger than zero with the third section, such as an obtuse angle, such as an angle between 130 and 150 degrees.
16. A hearing device according to any of embodiments 10-15, wherein the carrier board is configured to form an electromagnetic shield between the magnetic induction coil and the multi-chip assembly.
17. A hearing device according to any of the preceding embodiments, further comprising a wireless communication unit interconnected with an RF antenna for emission and reception of an electromagnetic field in a radio frequency range, wherein the RF antenna and the wireless communication unit are provided in the first end of the hearing device housing.
18. A hearing device according to embodiment 17, wherein the wireless communication unit is provided as part of the multi-chip assembly.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

REFERENCE SIGNS LIST

100 Hearing Device
102 Microphone
104 Signal Processor
106 Speaker/Receiver
108 Wireless communication unit
110 Power Circuit
112 Battery
114 MI Control chip
116 MI Coil
118 RF Antenna
204a, 204b Microphones
206 Multi-chip Assembly
207 Multi-chip Assembly substrate
208 Second carrier board (Flex PCB)
210 First carrier board (Flex PCB)
211 first plane 212 Third carrier board
213 Electrical interconnection
216 Battery contacts
218 Center axis of battery
220 First end of hearing device housing
222 Second end of hearing device housing
224 Shielding layer
310 Carrier board
312 First side of carrier board 314 Second side of carrier board
411 First section of carrier board 310
411' First plane
413 Second section of carrier board 310
413' Second plane
415 Third section of carrier board 310
415' Third plane
417 Fourth section of carrier board 310

The invention claimed is:
1. A hearing device comprising:
a carrier board;
a multi-chip assembly including a magnetic induction control chip and a signal processor;
a magnetic induction coil at the carrier board;
a hearing device housing having a first end and a second end, the second end being opposite from the first end; and
a battery, wherein the battery is provided closer to the second end of the hearing device housing than to the first end of the hearing device housing;
wherein the multi-chip assembly and the magnetic induction coil are accommodated in the hearing device housing, and are between the battery and the first end of the hearing device housing.

2. The hearing device according to claim 1, wherein a distance from a centre axis of the battery to the second end is shorter than a distance from the centre axis of the battery to the first end.

3. The hearing device according to claim 1, further comprising one or more microphones between the battery and the first end of the hearing device housing, and wherein the one or more microphones and the multi-chip assembly are between the battery and the magnetic induction coil.

4. The hearing device according to claim 1, wherein the carrier board comprises an electromagnetic shielding layer.

5. The hearing device according to claim 1, wherein at least a part of the carrier board at which the magnetic induction coil is located is configured to provide an electromagnetic shield between the magnetic induction coil and the multi-chip assembly.

6. The hearing device according to claim 1, further comprising one or more microphones, wherein the carrier board comprises conductive traces configured to transmit power from the battery to the one or more microphones.

7. The hearing device according to claim 1, wherein the magnetic induction coil has a longitudinal direction parallel to an ear-to-ear axis of a user of the hearing device, when the hearing device is at an intended operational position with respect to an ear of the user.

8. The hearing device according to claim 1, wherein the battery is a rechargeable battery, and wherein the multi-chip assembly of the hearing device further comprises a rechargeable battery controller.

9. The hearing device according to claim 1, further comprising one or more microphones configured to receive an audio signal, the one or more microphones located at the carrier board.

10. The hearing device according to claim 1, wherein the carrier board has a first side and a second side opposite the first side, wherein the multi-chip assembly is on the first side of the carrier board, and wherein the magnetic induction coil is on the second side of the carrier board.

11. The hearing device according to claim 10, wherein the carrier board has a first section extending in a first plane, and a second section extending in a second plane;
wherein the first plane forms a first angle with the second plane; and
wherein the multi-chip assembly is at the first section of the carrier board, and the magnetic induction coil is at the second section of the carrier board.

12. The hearing device according to claim 1, wherein the carrier board has a first section extending in a first plane, and a second section extending in a second plane;
wherein the first plane forms a first angle with the second plane; and
wherein the multi-chip assembly is at the first section of the carrier board, and the magnetic induction coil is at the second section of the carrier board.

13. The hearing device according to claim 12, further comprising one or more microphones, wherein the magnetic induction coil is on a first side of the carrier board, and the one or more microphones are on a second side of the carrier board opposite from the first side.

14. The hearing device according to claim 1, further comprising one or more microphones;
wherein the carrier board has a first section extending in a first plane, a second section extending in a second plane, and a third section extending in a third plane, the second section being between the first and third sections;
wherein an angle between the second plane and the first plane is larger than an angle between the first plane and the third plane;
wherein the multi-chip assembly is at the first section of the carrier board; and
wherein the one or more microphones and/or the magnetic induction coil are at the third section of the carrier board.

15. The hearing device according to claim 14, wherein the first side of the carrier board in the first section faces the first side of the carrier board in the third section.

16. The hearing device according to claim 14, wherein the first plane and the third plane are parallel.

17. The hearing device according to claim 14, wherein the one or more microphones are at the third section of the carrier board, and the magnetic induction coil is at the second section of the carrier board.

18. The hearing device according to claim 1, further comprising one or more microphones;
wherein the carrier board has a first section extending in a first plane, a second section extending in a second plane, and a third section extending in a third plane, the second section being between the first and third sections;
wherein the multi-chip assembly is at the first section of the carrier board, and the one or more microphones are at the third section of the carrier board;
wherein the carrier board further has a fourth section extending from the third section, the fourth section being bent in a direction towards the first plane, and
wherein the magnetic induction coil is at the fourth section of the carrier board.

19. The hearing device according to claim 1, further comprising one or more microphones;
wherein the carrier board has a first section extending in a first plane, a second section extending in a second plane, and a third section extending in a third plane, the second section being between the first and third sections;
wherein the multi-chip assembly is at the first section of the carrier board, and the one or more microphones are at the third section of the carrier board;
wherein the carrier board further has a fourth section extending from the third section, the fourth section extending in a fourth plane, the third plane and the fourth plane forming an oblique angle, and wherein the magnetic induction coil is at the fourth section of the carrier board.

20. The hearing device according to claim 1, wherein the carrier board is configured to form an electromagnetic shield between the magnetic induction coil and the multi-chip assembly.

21. The hearing device according to claim 1, further comprising a wireless communication unit interconnected with a RF antenna, wherein the RF antenna and the wireless communication unit are located closer to the first end of the hearing device housing than to the second end.

* * * * *